United States Patent
Frankowski

[15] 3,661,675
[45] May 9, 1972

[54] METHOD OF USING POLYETHYLENE TEREPHTHALATE AS A BONDING ADHESIVE

[72] Inventor: Jozef Frankowski, La Jolla, Calif.

[73] Assignee: General Dynamics Corporation, San Diego, Calif.

[22] Filed: Oct. 30, 1968

[21] Appl. No.: 771,902

[52] U.S. Cl............................................156/285, 156/306
[51] Int. Cl.......................................................B29c 17/00
[58] Field of Search..........................156/285, 306, 322, 382

[56] References Cited

UNITED STATES PATENTS

| 2,719,100 | 9/1955 | Banigan | 156/306 X |
| 2,786,778 | 3/1957 | Palmquist | 156/332 X |
| 3,000,775 | 9/1961 | Shaw et al. | 156/332 X |
| 3,054,703 | 9/1962 | Brasure | 156/332 X |
| 3,078,201 | 2/1963 | Christie | 156/306 X |
| 3,188,265 | 5/1965 | Charbonneau | 156/306 X |
| 3,198,686 | 8/1965 | Caligari | 156/332 X |
| 3,372,148 | 3/1968 | Wiener | 156/332 X |
| 3,493,451 | 2/1970 | Beery | 156/382 X |

Primary Examiner—Benjamin R. Padgett
Assistant Examiner—Gary G. Solyst
Attorney—Neil F. Martin and Carl R. Brown

[57] ABSTRACT

A method of bonding a sheet or film of polyethylene terephthalate to another sheet of polyethylene terephthalate or in employing a sheet of polyethylene terephthalate as a high strength adhesive for bonding materials together wherein the sheet or sheets of polyethylene terephthalate are placed in pressure contact with each other or in pressure contact with materials to be bonded together, in a continuously evacuated environment and are heated to a temperature sufficient to out gas impurities from the polyethylene terephthalate sheets and fuse the sheets to the adjacent surface.

3 Claims, 4 Drawing Figures

Patented May 9, 1972

3,661,675

INVENTOR.
JOZEF (NMI) FRANKOWSKI

BY *Neil F. Martin*

ATTORNEY

3,661,675

METHOD OF USING POLYETHYLENE TEREPHTHALATE AS A BONDING ADHESIVE

BACKGROUND OF THE INVENTION

There is a need for a high strength adhesive for bonding metal to metal, metal to glass, metal to a ceramic, metal to reinforced materials, such as laminates, and also for bonding dissimilar materials such as stainless steel to titanium, stainless or aluminum. There is a particular need for such an adhesive that can maintain a high strength bond at elevated and cyrogenic temperatures and for providing multilayer insulation on space propulsion stages that are subject to both elevated temperatures and to cyrogenic temperatures. While sheets or layer of polyethylene terephthalate, better known by the trade name Mylar, are used for multilayer insulation on space propulsion stages, it has been necessary to use other adhesives to bond the sheets of Mylar to the space propulsion stages. It has been found that the melting temperature and the degregation temperature or oxidation temperature of Mylar at ambient pressure are very close together, and the out gassed material during Mylar heating condenses on the surfaces of the Mylar sheets or on the surfaces of the adherends making it impossible to provide a good bond between the Mylar sheets or to employ Mylar sheets as an adhesive. While the Mylar sheets have relatively high strength at elevated and cyrogenic temperatures, the adhesives often break down at such temperature ranges. Further it is more expensive and requires added complexity to use known adhesives for joining Mylar sheets to other Mylar sheets or to adhering Mylar sheets to other materials.

Thus it is advantageous to be able to bond polyethylene terephthalate or Mylar sheets to other Mylar sheets or Mylar sheets to other materials with a high strength bond employing Mylar sheets as the sole bonding or adhesive material without requiring other adhesives.

SUMMARY OF THE INVENTION

In the methods of this invention, polyethylene terephthalate or Mylar sheets or films are applied to other sheets or films of Mylar in a vacuum that is continuously evacuated by a suitable vacuum pump. The abutting films are enclosed with a porous material, such as glass cloth, that has a melting temperature higher than that of Mylar. A low magnitude pressure is applied to opposite surfaces of the glass cloth and Mylar films and the environment is heated for a short period of time to a temperature sufficient to out gas impurities from the polyethylene terephthalate or Mylar sheets. The two layers of Mylar sheets are fused together under the temperature and pressure and the out gassed impurities that otherwise would condense on the surfaces of the Mylar sheets and destroy the bond therebetween are removed by the vacuum pump.

In other embodiments of the invention, a polyethylene terephthalate or Mylar film is applied to the smooth surface of a material, such as metal, glass, ceramic, reinforced materials, or other suitable materials in a vacuum that is continuously evacuated. A porous film of, for example, glass cloth, is laid on the outer surface of the Mylar sheet and a slight pressure is applied to the film holding the sheet in contact with the material. Again the environment is heated to a temperature sufficiently high to out gas impurities from the Mylar sheet and fuse the sheet to the surface of the material. The same process is employed to bond a Mylar sheet to the smooth surface of a second material. Then the bonded Mylar surfaces of the two materials are joined together in the vacuum environment and under contact pressure. The bonded sheets are heated to the fusing temperature that may be in the order of 500° to 650° Fahrenheit for at least 10 seconds, wherein the polyethylene terephthalate bonding fuses together providing a high strength adhesive bond that joins the materials together.

The polyethylene terephthalate sheet may comprise type A Mylar made by DuPont Corporation. The minimum applied pressure during the bonding step is about $1 \times 10^{-4}$ Torr and the out gassing temperature is about 550° to 670° Fahrenheit for a time period of 3 to 30 seconds, depending upon the thickness of the Mylar sheets fused. Generally the Mylar sheets have a thickness of about 0.005 of an inch. It has been found that the high strength bond is maintained at temperatures ranging from about −423° to 400° Fahrenheit.

It is therefore an object of this invention to provide a new and improved method of bonding sheets of polyethylene terephthalate.

It is another object of this invention to provide a new and improved method for employing sheets of polyethylene terephthalate as a high strength adhesive for bonding metal to metal, metal to glass, metal to ceramic, metal to reinforced materials, and for bonding dissimilar metals.

It is another object of this invention to provide a new and improved method for bonding sheets of polyethylene terephthalate or for employing sheets of polyethylene terephthalate as a high strength adhesive that permits out gassing of impurities from the polyethylene terephthalate sheets and that fuses the sheets to the adjacent surfaces to be bonded.

Other object and many attended advantages will become more apparent upon a reading of the following detailed specification and an examination of the drawings wherein like reference numerals designate like parts throughout and in which.

Figure 1:
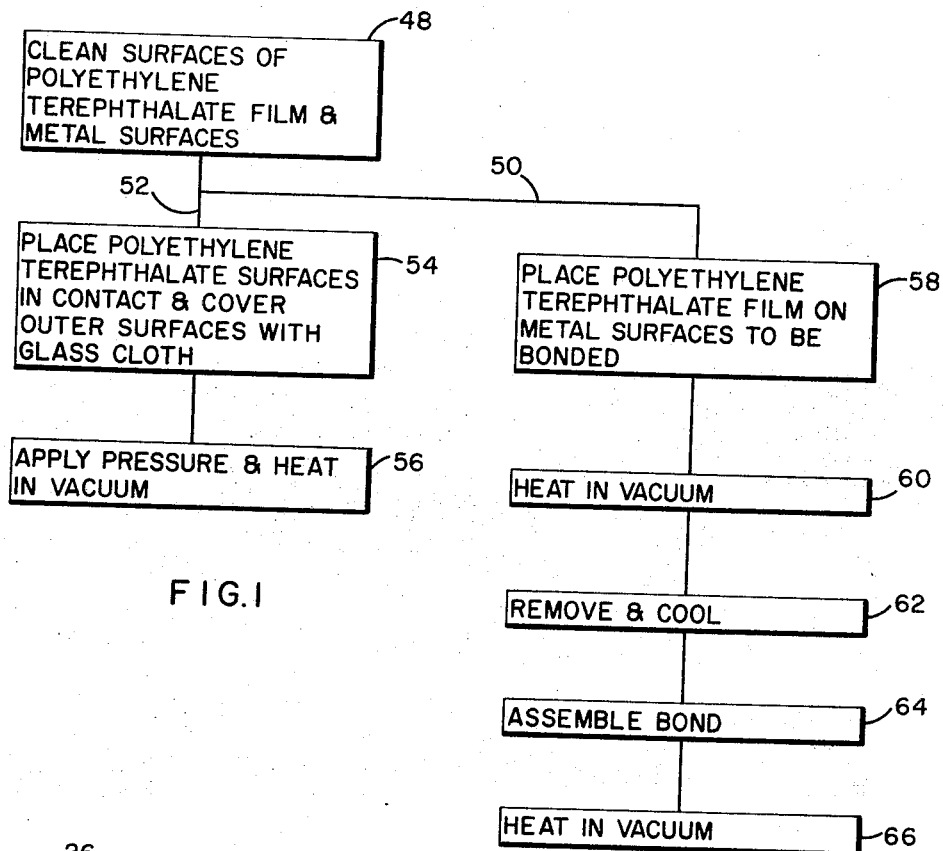
FIG. 1 is an illustration in block form of steps in the method of this invention.
Figure 2:
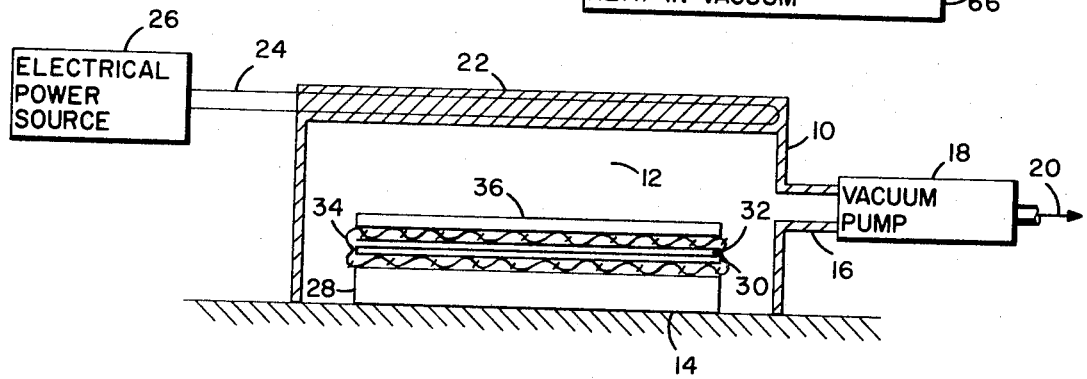
FIG. 2 is a schematic view of a vacuum oven chamber having Mylar sheets positioned for being bonded together.

A polyethylene terephthalate sheet, such as Mylar made by the DuPont Corporation, is employed to bond sheets of Mylar to other sheets of Mylar or in bonding Mylar to the surface of another material, or as a high strength adhesive for bonding materials to other materials. The Mylar sheets are initially cleaned by wiping with a lint free cloth that may be moistened with acetone or other suitable cleaners and that is allowed to dry in air. The surfaces of metal sheets or sheets of other materials may be cleaned in any suitable manner, depending upon the material. In the method of joining polyethylene terephthalate sheets or Mylar sheets 30 and 32, see FIG. 2, the sheets are joined together with a layer of glass cloth 34 laid on the outer surface of the abutting sheets. The glass cloth 34 and abutting sheets are laid on a rigid surface 28 and an over plate 36 is laid on the upper surface of the glass cloth 34. The assembly is positioned in an evacuated environment 12 that is evacuated by a suitable vacuum pump 18 that draws gases through input conduit 16 and ejects the gases through output line 20. The housing 10 of the vacuum chamber comprises an evacuated oven having a top surface 22 with an insulated heating coil 24 that passes therethrough. An electric power source 26 supplies power to the heating coil 24 that heats the chamber 10 and thus raises the temperature in the space 12 to the required temperature for joining the polyethylene terephthalate sheets. It should be understood that only a representative showing of an enclosed, evacuated oven 10 is illustrated in FIG. 2 and other suitable vacuum ovens may be employed.

The temperature in vacuum 12 is raised to heat the respective Mylar sheets to a temperature of about 550° to 670° Fahrenheit for a period of time of approximately 3 to 30 seconds. This temperature causes impurities in the commercial grade Mylar to out gas in the form of a gas discharge. This gas is drawn by vacuum pump 18 through the porous glass cloth 34 and is pumped to the outer atmosphere through conduit 20. This removes the out gassed impurities from the bonding surface of the Mylar sheets and upon cooling the Mylar sheets are fused together in a high strength bond. The same process is employed to bond a Mylar sheet to a sheet of material as illustrated in FIG. 4, with the exception that the glass cloth is only laid on the Mylar side.

It has been found that between the temperatures of 550° to 670° Fahrenheit, the polyethylene terephthalate sheets become hot enough to flow but do not melt. The polyethylene terephthalate sheet adheres to the adjacent polyethylene terephthalate sheet and does not adhere to the glass cloth. The pressure applied to the joined sheets need not be large. However, the pressure should be enough to obtain intimate contact between the adjacent surfaces of the sheets. It has been found by experimentation that if the temperature is lower than 550° Fahrenheit, then there is insufficient out gassing of the impurities and a poor bond results. If the temperature is above about 670° Fahrenheit, the Mylar film darkens because the degradation temperature of the Mylar film has been exceeded. For Mylar sheets of the thickness of 0.005 or less, a temperature time of 3 seconds will normally provide sufficient time for out gassing of the impurities to provide a reasonably good bond. When the thickness of the Mylar sheet is increased, the time may extend to the order of 30 seconds.

It may be understood that the aforesaid process may be repeated to laminate several layers of polyethylene terephthalate sheets or to apply a polyethylene terephthalate sheet surface to other materials. In the method of applying polyethylene terephthalate sheets to, for example a metal surface, the sheet of metal 44 may be placed on the support member 28 in the vacuum oven 10. A polyethylene terephthalate sheet 46 is then laid on the upper surface of the metal sheet 44 and a layer of glass cloth is placed on the upper surface of the Mylar sheet 46, and plate 36 is placed thereon for the required pressure. The vacuum environment 12 is then heated to the temperature sufficient to out gas impurities from the polyethylene terephthalate sheet and fuse the polyethylene terephthalate sheet to the surface of the sheet of metal 44. It may be understood that successive layers of polyethylene terephthalate sheets may be similarly applied to the other side of the sheet metal 44 or to successive surfaces of polyethylene terephthalate sheets forming laminate films on the metal surface 44.

Figure 3:
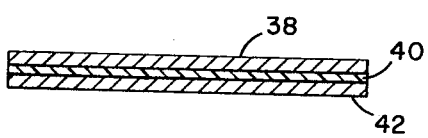
FIG. 3 is a cross sectional view of sheets of metal that are bonded together with a Mylar sheet.
Figure 4:
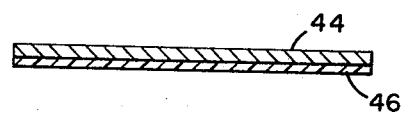
FIG. 4 is a cross sectional view of a Mylar sheet bonded to a metal sheet.

To join one material with another material, such as illustrated in FIG. 3, a sheet of metal, for example sheet metal 42, has a sheet 40 of polyethylene terephthalate applied thereto in the manner described relative to FIG. 4. A similar sheet of polyethylene terephthalate 40 is applied to the surface of a metal sheet 38 in the same manner as previously described relative to FIG. 4. These two sheets, 38 and 42, are then laid one on top of the other with the bonded polyethylene terephthalate sheet in abutting position. Contact pressure between the adjacent bonded surfaces is obtained by the weight of the upper material, or by such other additional pressure as necessary to achieve overall contact pressure. After the bond is assembled, the respective sheet elements are placed in a vacuum oven and raised to a temperature of 500° to 650° Fahrenheit for a time period of about 10 seconds or more duration, depending upon the thermal properties of the materials being joined, the heat up time of the materials being joined, the thickness of the sheet materials being joined, and other recognizable factors, to achieve a fusing of the polyethylene terephthalate bonds. Upon cooling, a high strength bond between the respective sheet materials is achieved.

The heating and joining of the respective sheets and materials in the vacuum not only draws out gassed impurities from the heated vacuum environment, but also prevents oxidation of bonding surfaces between the joined materials. The following specific examples will serve to further illustrate the practice of the invention.

I

A pair of sheets of polyethylene terephthalate, type A DuPont Mylar, having a thickness of 5 mils, were laid one on top of the other and covered with glass cloth after being suitably cleaned. Under a pressure of $1 \times 10^{-4}$ Torr, the sheets were heated in a vacuum environment that was continuously evacuated for approximately 3 seconds at a temperature of 550° Fahrenheit. The joined polyethylene terephthalate sheets were removed and the laminated sheets were found to have a high strength bond.

II

A pair of polyethylene terephthalate sheets, type A DuPont Mylar, having a thickness of approximately 0.005 mils, were covered with glass cloth and placed in a vacuum environment that was continuously evacuated under a pressure in the order of $2.5 \times 10^{-3}$ Torr. The sheets were heated to a temperature of about 665° Fahrenheit for 5 minutes and were then removed and cooled. A high strength bond was obtained.

III

A polyethylene terephthalate sheet of type A DuPont Mylar having a thickness of about 0.005 mils, was applied to a sheet of stainless steel having a thickness of about 0.02 of an inch in a continuously evacuated environment of approximately $1.8 \times 10^{-4}$ Torr and a temperature environment of about 665° Fahrenheit for a period of about 5 minutes. The joined materials were removed from the environment and tested to have a lap strength of about 4,000 psi.

IV

A Mylar film of about 5 mils was applied to a sheet of titanium having a thickness of about 0.02 inch at a temperature of about 550° Fahrenheit for a period of about 2 minutes under a bonding pressure ranging from $1.2 \times 10^{-3}$ to $2.5 \times 10^{-3}$ Torr in a continuously evacuated oven. The joined material was removed and cooled and found to have a high strength bond.

V

The bonded stainless steel sheet of the above referenced Experiment III and the bonded titanium sheet of the above referenced Experiment IV, were joined together with their polyethylene terephthalate surfaces abutting and were heated to a temperature of 500° Fahrenheit for about 2 minutes in a vacuum pressure in the order of $1 \times 10^{-4}$ Torr. The joined metals were removed and tested and found to have a lap strength of 4,000 psi in tensil sheer.

VI

The separate bonded sheets of experiment V above, were joined in abutting relationship and heated to a temperature of 665° Fahrenheit with a bonding pressure varying from $1.8 \times 10^{-4}$ to $2.5 \times 10^{-3}$ Torr in a vacuum environment for a period of 5 minutes. The joined bonded sheets were removed and cooled and various sections were tested for tensil strength and lap strength and found to have an average lap strength of 5,238 psi.

Having described my invention, I now claim:

1. A method of bonding a sheet of polyethylene terephthalate to a second sheet of material having a melting temperature at least as high as polyethylene terephthalate, comprising the steps of;

positioning in an evacuable chamber a sandwich assembly comprising a sheet of polyethylene terephthalate laid upon a second sheet of material; said sandwich assembly positioned upon a rigid surface such that said second sheet of material is in direct contact with said rigid surface;

and heating said sandwich assembly to a temperature of from about 550° to 670° F. for about at least 3 seconds in a partial-vacuum environment to cause out gassing of impurities and bonding of the polyethylene terephthalate sheet to the second sheet of material.

2. The method according to claim 1, wherein a porous sheet being non-bondable with polyethylene terephthalate at said temperatures is positioned upon the sandwich assembly in direct contact with the polyethylene terephthalate sheet and an over-plate is positioned upon said porous sheet so as to cause the polyethylene terephthalate sheet to be in more intimate contact with said second sheet of material.

3. The method according to claim 2, wherein the second sheet of material is polyethylene terephthalate, and comprising the additional step of disposing a porous sheet being nonbondable with polyethylene terephthalate at said temperatures between the sandwich assembly and said rigid surface.

* * * * *